Figure 1:
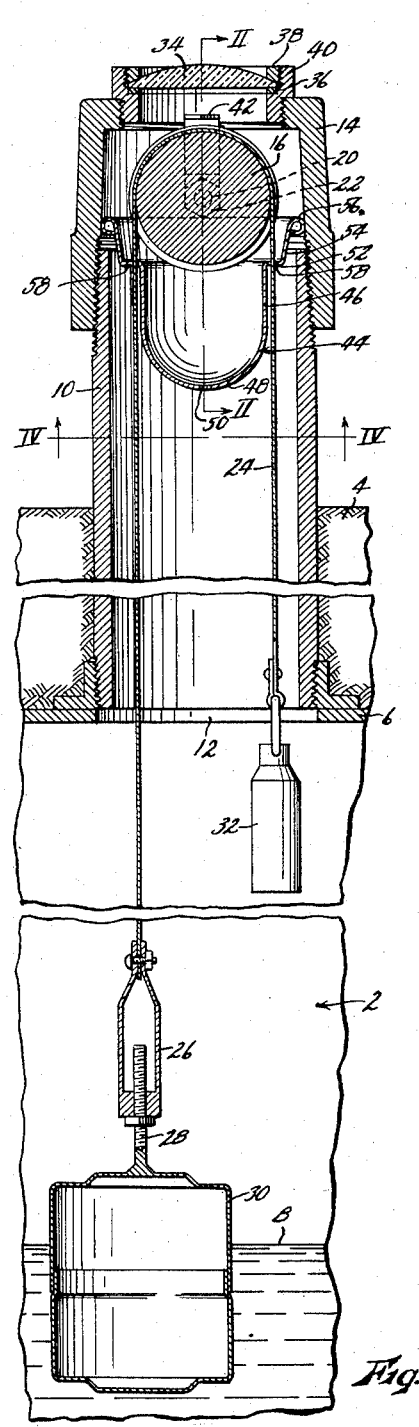

Sept. 23, 1958      I. W. STEIL      2,852,938

LIQUID LEVEL GAUGE FOR UNDERGROUND TANKS

Filed Nov. 6, 1956

INVENTOR
Irvin W. Steil
BY Hamilton + Hamilton
Attorneys.

United States Patent Office 2,852,938
Patented Sept. 23, 1958

2,852,938

LIQUID LEVEL GAUGE FOR UNDERGROUND TANKS

Irvin W. Steil, Kansas City, Mo.

Application November 6, 1956, Serial No. 620,721

3 Claims. (Cl. 73—321)

This invention relates to new and useful improvements in liquid level gauges, and has particular reference to gauges of the sealed type such as are used for reading the liquid level in underground tanks. Such gauges commonly employ an above-ground chamber in communication with the tank, and having a window therein through which gauge members within the chamber may be observed. All previous gauges of this type within my knowledge have been subject to a serious disadvantage in cold weather usage in that during such weather there is established a convection current of relatively warm, moisture-laden air from the tank to the above-ground chamber, with the result that moisture is condensed within the chamber. Not only would this condensation cause fogging or frosting of the viewing window so as to render the reading of the gauge difficult or impossible, but also the condensation might freeze and immobilize any working parts of the gauge itself, and render it totally inoperative.

The principal object of the present invention is, therefore, the provision of a gauge of the general class described having novel means for elimination of the disadvantages resulting from condensation. Generally, this object is accomplished by the provision of a condenser operative to dehydrate the warm, moist air before it reaches the actual guage chamber, so that the air reaching said chamber is sufficiently dry to avoid condensation of moisture therefrom.

Other objects are economy and simplicity of construction, efficiency and dependability of operation, and adaptability of the invention principles involved for use in various types of instruments.

Figure 2:
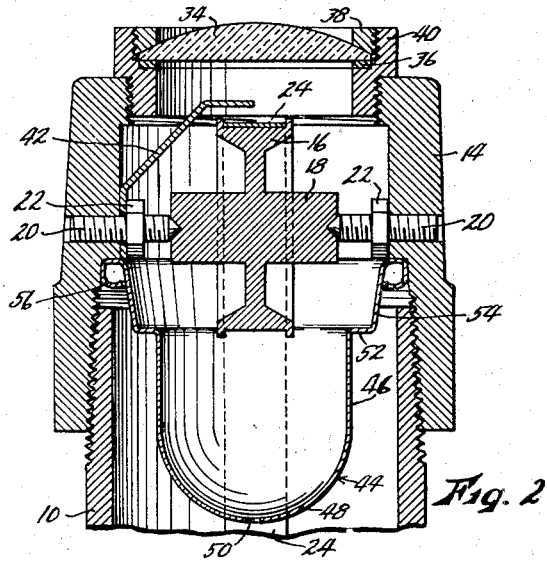
Figure 3:
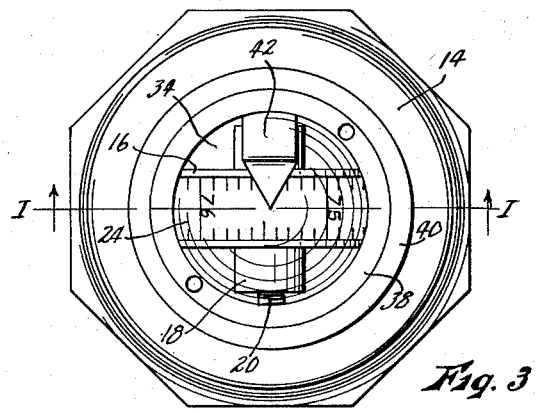
Figure 4:
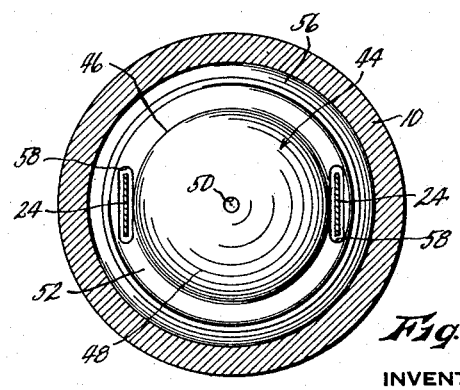

With these objects in view, as well as other objects which will appear in the course of the specification, reference will be had to the drawing, wherein:

Fig. 1 is a foreshortened vertical sectional view of a liquid level gauge embodying the present invention, and its related parts, being a reduced section taken on line I—I of Fig. 3, Fig. 2 is an enlarged, fragmentary sectional view taken on line II—II of Fig. 1, Fig. 3 is a top plan view of the gauge, and Fig. 4 is an enlarged sectional view taken on line IV—IV of Fig. 1.

Like reference numerals apply to similar parts throughout the several views, and the numeral 2 applies to a tank buried underground, the ground level being indicated at 4, the top wall of the tank being indicated at 6, and the liquid level in the tank being indicated at 8. A vertical pipe 10 is fitted at its lower end into a top opening 12 of the tank, and extends upwardly above the ground level, as shown. The upper end of said pipe is closed by a screw cap 14, which also constitutes the gauge housing.

Mounted within said housing for rotation on a horizontal axis is a flanged pulley 16. The hub 18 of said pulley is engaged respectively at its opposite ends by the confronting conical ends of a pair of screws 20, said screws being coaxial and threaded into the wall of cap 14 at diametrically opposite points. Said screws are adjustable to take up wear in the pulley bearings, and each screw is secured by a lock nut 22. Trained over the pulley 16 is a flexible tape 24 on which suitable indicia is imprinted, as shown in Fig. 3. Both ends of the tape hang freely downwardly through pipe 10 into tank 2. Attached to one end of said tape is an elongated nut member 26 in which is threaded a screw rod 28 which is secured to a buoyant float 30 which floats at the liquid level 8 of the tank. Attached to the other end of the tape is a counter-weight 32 which is sufficiently heavy to maintain the tape taut, but which is lighter than float 30.

With the gauge arranged as shown in Fig. 1, it will be seen that the liquid level may be observed by reading the indicia on tape 24 at the point it passes over pulley 16. The tape is viewed through a window in the upper end of housing cap 14, said window constituting a magnifying glass 34 secured between gasket 36 and clamp ring 38 in a mounting ring 40 threaded into cap 14. Accurate reading of the tape is assisted by an indicator finger 42 having the pointer end thereof disposed above the pulley, and having its opposite end clamped between one of lock nuts 22 and the wall of cap 14. The tape obviously may be calibrated either directly in gallons or other units of volume, or in inches or other linear units. In the latter case the gauge would be used in conjunction with a chart on which the tank contents in gallons is charted against the tape readings. In this manner, by using different charts, one tape could be used in any tank.

With the gauge thus far described, the usual occurrence in cold weather has been that the relatively warm, moist air would rise through pipe 10, being lighter than the air within the pipe above ground level, and within housing 14, which is of course rapidly cooled. After being cooled, the air would flow downwardly through the pipe into the tank. The convection current thus set up constitutes a rising column of warm air in the center or axial portion of the pipe, and a downwardly travelling sheath of cool air directly adjacent the pipe walls. The cooling of the air in housing 14, if sufficient to lower the temperature thereof below the dew point, produces condensation within housing 14. This condensate will fog the glass 34 so the gauge cannot be read, or is sufficiently cold, may freeze the tape 24 to pulley 16, rendering the gauge inoperative.

The present invention contemplates the additional usage of a condenser indicated generally by the numeral 44 and disposed in the lower portion of housing cap 14 and the upper portion of pipe 10. It is generally cup-shaped, being formed of a thin sheet material having high heat conductivity, such as aluminum, though other materials could be used. It has a substantially cylindrical hollow portion 46 disposed coaxially with the gauge housing, and between the depending reaches of tape 24, though it does not contact said tape. Cylindrical portion 46 is closed at its lower end by a hemispherical portion 48 having a hole 50 formed therethrough at its lower end. Cylindrical portion 46 is provided at its upper end with an outwardly extending peripheral flange 52, and an upwardly extending, conically flaring portion 54. Conical portion 54 is provided around its upper edge with a rolled bead 56 which is crimped tightly against the inner surface of housing cap 14, just below screws 20. Flange 52 has a pair of holes 58 formed therethrough at diametrically opposite points, so shaped that the depending reaches of tape 24 extend therethrough without contacting the edges thereof, as best shown in Fig. 4.

It is important that the condenser have thorough and intimate contact at its upper edge with housing 14, so that heat received by the condenser will be quickly conducted to the housing and thence dispersed in the atmosphere. The condenser could obviously be welded, threaded or driven into the housing, as well as being secured by the method shown. By the heat transfer process just described, the condenser will, in cold weather, be maintained substantially cooler than the current of warm, moist air rising through the center portion of pipe 10. Thus said moist air contacts and is cooled by said condenser before said air rises to the level of the tape holes 58 in the condenser, and the moisture thereby condensed therefrom is deposited on the outer surface of the condenser, and eventually drips back into the tank. Actual test in below-freezing weather have shown that the lower portion of the condenser, usually only the hemispherical portion 48 thereof and the lower fraction of cylindrical portion 46, will become heavily frosted, while the upper part of cylindrical portion 46 will remain moisture-free. Air passing through holes 58 into the main body of the housing will be sufficiently dry that substantially no condensation on glass 34 or on the pulley will occur.

Hole 50 in the bottom of the condenser is sufficiently small that the volume of warm air rising therethrough will not be appreciable, and will in any event be dehydrated by contact with the condenser. However, said hole does provide for drainage from the condenser of any condensate which might be removed from air passing through holes 58 in extreme conditions.

While I have shown and described a specific embodiment of my invention, it will be apparent that many minor changes of structure and operation could be made without departing from the spirit of the invention as defined by the scope of the appended claims.

What I claim as new and desire to protect by Letters Patent is:

1. A liquid level gauge for use in connection with an underground tank having a pipe interconnected therewith and extending above ground level, said gauge comprising a housing closing and sealing the upper end of said pipe and having a transparent window therein, gauge members supported in said housing, being readable through said window and including a member depending downwardly through said pipe into said tank and movable responsively to the liquid level therein, and a moisture condenser comprising a heat-conducting member contacting said housing and closing the lower end thereof, said heat-conducting member having a restricted hole formed therethrough through which said depending gauge member is trained, and having a portion thereof extending downwardly into said pipe to a point spaced substantially below the portion thereof in which said hole is formed.

2. A liquid level gauge as recited in claim 1 wherein said heat-conducting member comprises a sheet metal cup secured around its upper edge in said housing and having a horizontal step formed in the wall thereof intermediate the top and bottom thereof, the hole formed therein for said gauge member being formed in said step.

3. A liquid level gauge as recited in claim 1 wherein said gauge members comprise a pulley mounted in said housing for rotation on a horizontal axis, a flexible calibrated tape trained over said pulley and having its end portions depending through said pipe into said tank, and a float and counterweight secured respectively to the ends of said tape, and wherein said heat-conducting member comprises a sheet metal cup secured around its upper edge in said housing and extending downwardly centrally into said pipe, said cup having a pair of holes formed therethrough adjacent its upper edge, the depending reaches of said tape being trained respectively through said holes.

References Cited in the file of this patent

UNITED STATES PATENTS

| 2,206,329 | Olson | July 2, 1940 |
| 2,274,396 | Barry | Feb. 24, 1942 |
| 2,348,362 | Rudolf | May 9, 1944 |
| 2,701,969 | Meredith | Feb. 19, 1955 |